US011984690B2

(12) United States Patent
Xue et al.

(10) Patent No.: US 11,984,690 B2
(45) Date of Patent: May 14, 2024

(54) POWER-INLET PLUG OF POWER SUPPLY TRACK AND POWER SUPPLY TRACK SYSTEM

(71) Applicants: Self Electronics Co., Ltd., Zhejiang (CN); Wanjiong Lin, Zhejiang (CN); Self Electronics USA Corporation, Norcross, GA (US)

(72) Inventors: Yuanfang Xue, Zhejiang (CN); Zhaoyong Zheng, Zhejiang (CN)

(73) Assignee: Self Electroncis Co., Ltd., Ningbo (CN)

( * ) Notice: Subject to any disclaimer, the term of this patent is extended or adjusted under 35 U.S.C. 154(b) by 299 days.

(21) Appl. No.: 17/457,556

(22) Filed: Dec. 3, 2021

(65) Prior Publication Data

US 2022/0181828 A1 Jun. 9, 2022

(30) Foreign Application Priority Data

Dec. 4, 2020 (CN) ......................... 202011403400.9

(51) Int. Cl.
*H01R 25/14* (2006.01)
*H01R 4/48* (2006.01)

(52) U.S. Cl.
CPC ............. *H01R 25/142* (2013.01); *H01R 4/48* (2013.01); *H01R 25/14* (2013.01)

(58) Field of Classification Search
CPC ........ H01R 4/48; H01R 25/14; H01R 25/142; H01R 25/161; H01R 25/168
See application file for complete search history.

(56) References Cited

U.S. PATENT DOCUMENTS 5,336,100 A * 8/1994 Gabrius ................ H01R 25/14 439/115
6,093,037 A * 7/2000 Lin ..................... H01R 25/162 439/115

* cited by examiner

*Primary Examiner* — Vanessa Girardi
(74) *Attorney, Agent, or Firm* — Wang Law Firm, Inc.

(57) ABSTRACT

A power-inlet plug has an installation seat, an elastic electrical conductive member and an external connector, the elastic electrical conductive member having a fixing portion and an elastic portion electrically connected to the fixing portion, the installation seat is provided with an installation cavity that accommodates the fixing portion and the external connector and a locking mechanism for detachable fix of the installation seat, the installation cavity is provided with an hole providing for the elastic portion extending out, and the elastic portion is provided with a retractable electrical contact. By setting the stop block, the permanent deformation and collapse of the shrapnel can be effectively prevented, and the problems of poor contact and contact failure can be solved. The locking part drives down the locking tongue and the power supply track extrusion locking structure design, effectively prevents the power-inlet plug from falling off.

14 Claims, 9 Drawing Sheets

POWER-INLET PLUG OF POWER SUPPLY TRACK AND POWER SUPPLY TRACK SYSTEM

RELATED APPLICATION

This application claims priority to Chinese Patent Application No. CN 202011403400.9, filed on Dec. 4, 2020.

FIELD OF THE TECHNOLOGY

The present invention relates to the technical field of electric power transmission, in particular to a power-inlet plug of power supply track and power supply track system.

BACKGROUND OF THE INVENTION

At present, the power supply on the shelf is mainly set on the back of the shelf and supplies power to the LED lamps through interconnected wires. With this type of power supply, it is often necessary to set holes in the shelf or need to bring the wire from the back of the shelf to the front of the shelf, resulting in inconvenient installation and difficult maintenance; If more than one LED lamp is set in the shelf, it will cause a plurality of wires in the shelf to be jumbled and staggered, occupy more space, and affect the overall beauty of the shelf and the effect of commodity display.

In order to solve the above problems, in the prior art, the power supply track will be set to realize the power supply at different positions. In general, the power supply track comprises a track body and a conductive strip arranged on the track body, and the power supply is realized through a electrical taking head matched with the electrical taking track. The power of the power supply track generally comes from the power inlet plug of one end. In the prior art, the power inlet plug is generally fixed to the power supply track and cannot be split, because the existing power supply track is generally applied to the shelf, which is divided into a table sticker installation and insert the shelf column, which can be disassembled for the power supply track, For example, for the embedded power supply track, and for the power supply track that is not easy to disassemble, it is not convenient to replace and maintain the power-inlet plug separately if it cannot be disassembled, which increases the maintenance cost.

BRIEF SUMMARY OF THE INVENTION

In view of this, the present invention provides an power-inlet plug of the power supply track and a power supply track system to solve the above technical problems.

An power-inlet plug of a power supply track comprising an installation seat, an elastic electrical conductive member and an external connector, characterized in that, the elastic electrical conductive member comprises a fixing portion and an elastic portion electrically connected to the fixing portion, the installation seat is provided with an installation cavity that accommodates the fixing portion and the external connector and a locking mechanism for detachable fix of the installation seat, the installation cavity is provided with an hole providing for the elastic portion extending out, and the elastic portion is provided with a retractable electrical contact.

- the locking mechanism comprises a locking tongue formed by the installation cavity extending outwards, both sides of the locking tongue are clamping edge, the middle portion of the locking tongue is provided with a first lock hole, and a detachable locking member is arranged in the first lock hole, and the reaction force of the locking member in the locking process is applied to the clamping edge to achieve the fixing of the installation seat.
- the elastic electrical conductive member is a strip-shaped shrapnel, and the strip-shaped shrapnel comprises a back section as a fixing portion and a front section as an elastic portion, and one end of the front section of the strip-shaped shrapnel is connected with the fixing portion, and the other end extends out the hole and bends outward to form an electrical contact.
- the installation cavity is provided with a plug block extending outwards to install the elastic portion, and the plug block comprises a block body and a lower baffle, the plug block is provided with a fixed groove that fixes the end of the front section of the shrapnel.
- the plug block is provided with a stop block located inside the electric contact.
- the front section of the shrapnel is inwardly bent in the portion between the electrical contact and the back section of the elastic sheet.
- the elastic electrical conductive member is provided with two.
- the electrical contacts of the two elastic portions are arranged backward
- the locking tongue is located above the plug block, and the plug block is provided with a second lock hole, which is coaxial arranged with the first lock hole and matched with the locking member.

A power supply track system comprising a power supply track and an power-inlet plug disposed at the end of the power supply track, characterized in that, the power supply track comprises two strip-shaped baffle, a bottom plate, and two strip-shaped electrical conductive member, and the bottom plate is located on the same side of two strip-shaped baffle and is connected with two strip-shaped baffle, and the two strip-shaped electrical conductive members are respectively arranged on the inside of two strip-shaped baffle;

- corresponding, the power-inlet plug comprises a installation seat, two elastic electrical conductive members and an external connector, and the elastic electrical conductive member comprises a fixing portion and an elastic portion electrically connected with the fixing portion, and the installation seat is provided with an installation cavity accommodating the fixing portion and the external connector and a detachable locking mechanism that disassembles the installation seat, and the installation cavity is provided with an hole for the elastic portion extending out, and the elastic portion is provided with a telescopic electrical contact, and the electrical contact of the two elastic portions is arranged backward to connect with two strip-shaped electrical conductive member respectively.

The bottom plate is provided with a plurality of connecting holes distributed along the length direction.

- the strip-shaped baffle is made of metal material, and the power supply track also comprises a strip-shaped insulating lining board arranged on the inner side of the strip-shaped baffle, and the strip-shaped electrical conductive member is arranged on the strip-shaped insulating lining board.
- the inner side of the strip-shaped baffle is provided with a card slot, and the locking mechanism comprises the installation cavity extending outward to form a locking tongue, and both sides of the locking tongue are clamping edges matched with the card slot, and the middle part of the locking tongue is provided with a first lock hole, the first lock hole is provided with a removable locking member, and the reaction force formed by the locking member in the process of locking is used to make the clamping edge and the card slot close to generate friction to achieve the installation seat fixed.

the elastic electrical conductive member is a strip-shaped shrapnel, the strip-shaped shrapnel comprises a rear section of the shrapnel as a fixing portion and a front section of the shrapnel as an elastic portion, one end of the front section of the shrapnel is connected with the fixing portion, the other end extends out the hole and bends outward to form an electric contact.

the installation cavity is provided with a block extending outwards for setting the elastic portion, and the block is provided with a fixed groove fixing the end of the front segment of the shrapnel.

the card slot is located above the strip-shaped electrical conductive member, and the locking tongue is located above the block, and the block is provided with a second lock hole, which is coaxial arranged with the first lock hole and matched with the locking member.

The technical effects of the present invention:

The power-inlet plug of the power supply track of the present invention and the power supply track system are in contact with elastic conductive members, rather than destructive connections, and effectively solve the problem of contact failure, contact failure due to long-term use; By setting the stop block, the permanent deformation and collapse of the shrapnel can be effectively prevented, and the problems of poor contact and contact failure can be solved; The locking part drives down the locking tongue and the power supply track extrusion locking structure design, effectively prevents the power-inlet plug from falling off.

BRIEF DESCRIPTION OF THE DRAWINGS

Embodiments of the present invention will be described below with reference to the drawings, in which.

DETAILED DESCRIPTION OF THE INVENTION

Specific embodiments of the present invention will be described in further detail below based on the drawings. It should be understood that the description of the embodiments of the present invention herein is not intended to limit the protection scope of the present invention.

Figure 1:
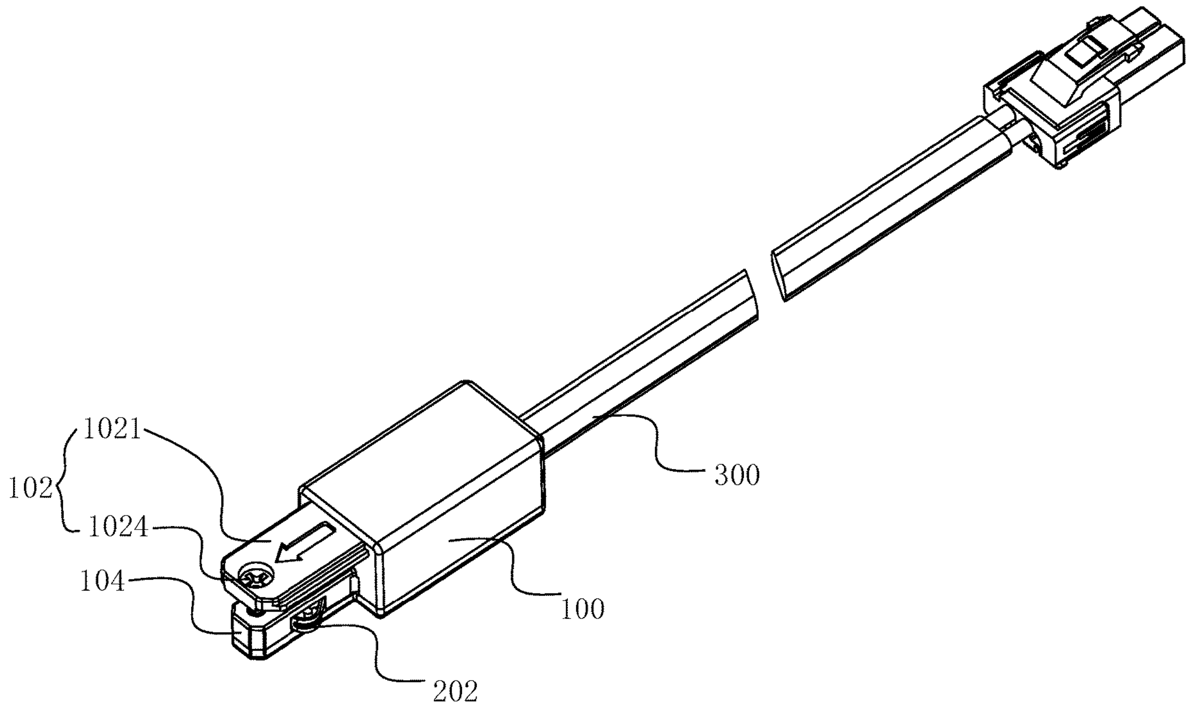
FIG. 1 is a three-dimensional structure diagram of a power-inlet plug of a power supply track in this embodiment.
Figure 2:
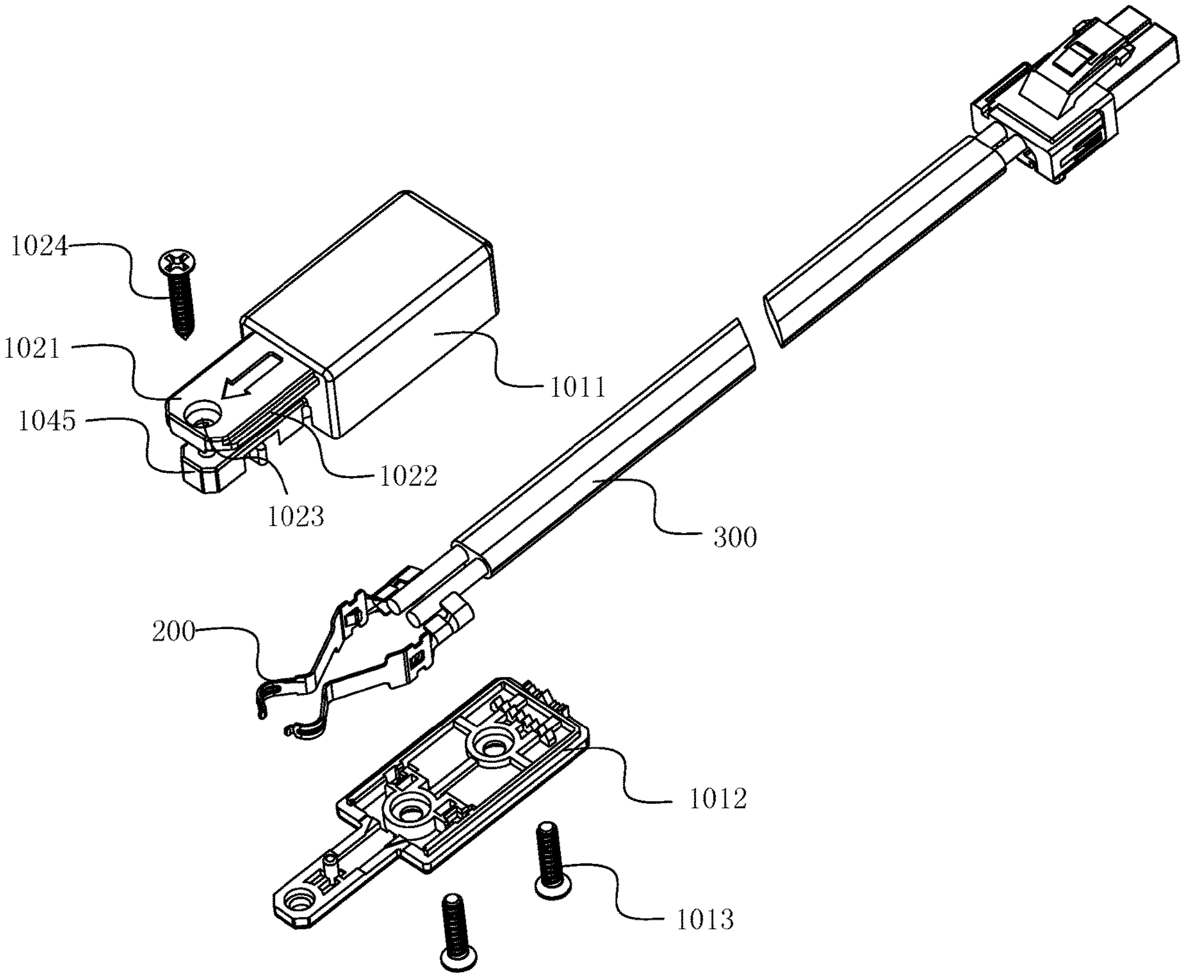
FIG. 2 is an explosive structure diagram of the power-inlet plug of the power supply track in this embodiment.
Figure 3:
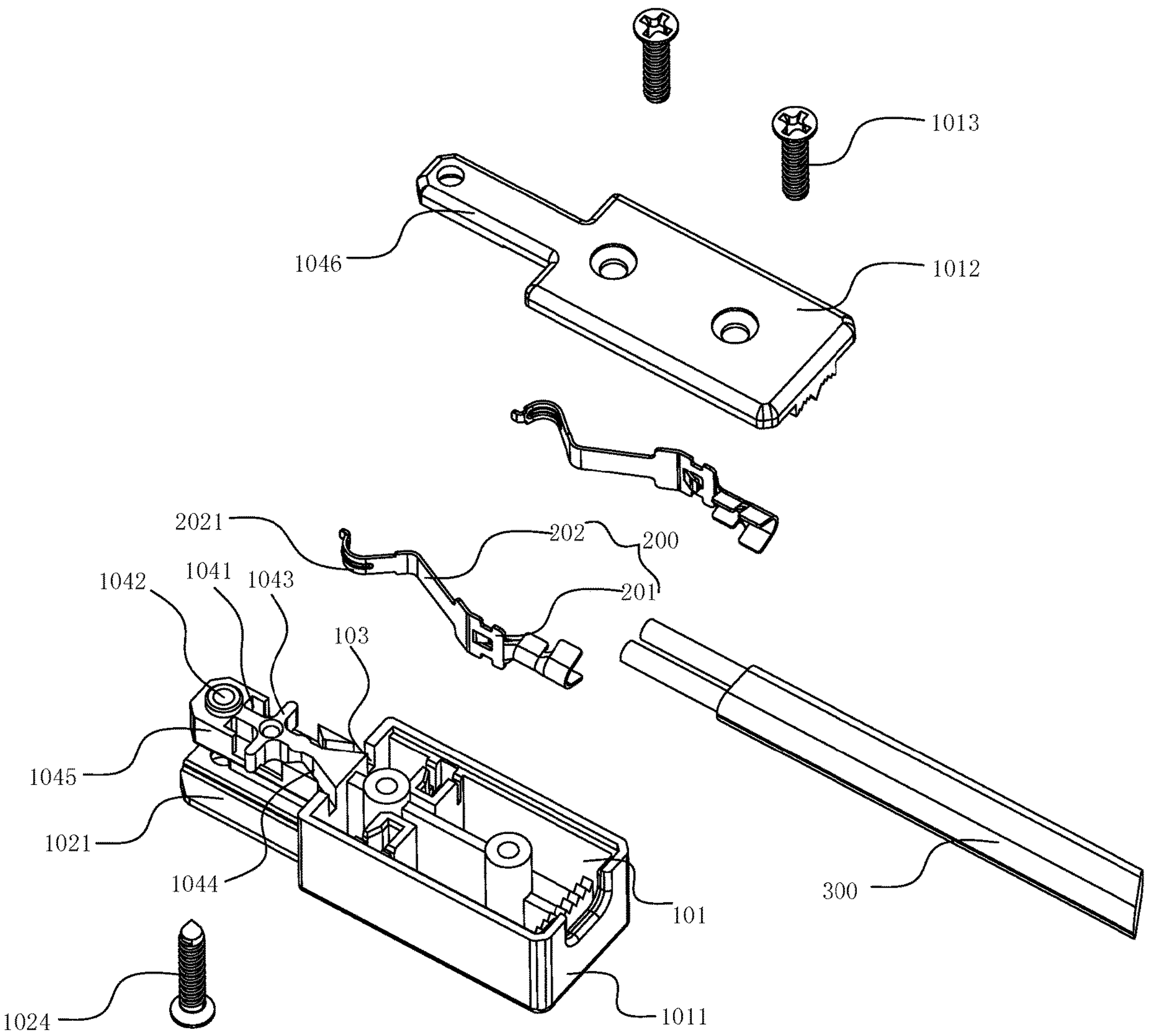
FIG. 3 is an explosive structure diagram of the power-inlet plug of the power supply track in another perspective in this embodiment.
Figure 4:
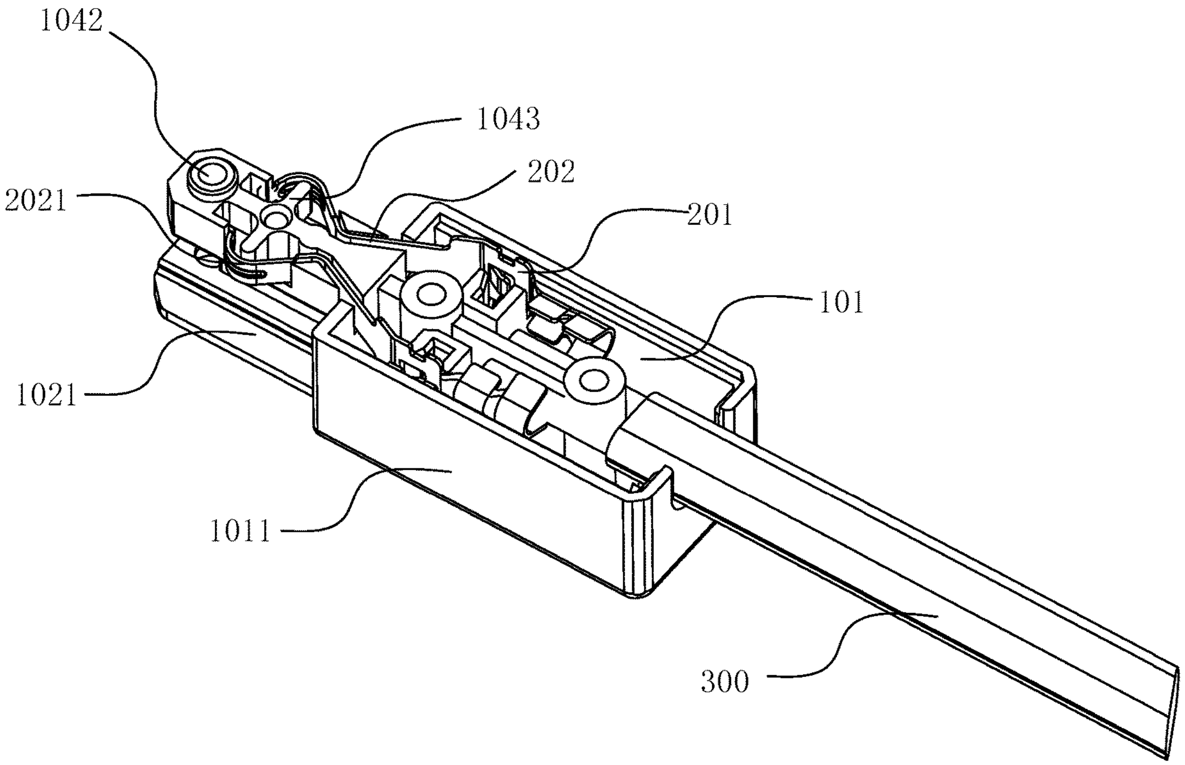
FIG. 4 is a three-dimensional structure diagram of the power-inlet plug (remove lower cover) of the power supply track in another perspective in this embodiment.

As shown in FIG. 1-4, the power-inlet plug 1000 of the power supply track in this embodiment includes an installation seat 100, an elastic electrical conductive member 200 and an external connector 300. The installation seat 100 is used to accommodate and fix other components and play the role of support and protection. The elastic electrical conductive member 200 includes a fixing portion 201 and an elastic portion 202 electrically connected to the fixing portion 201, and the fixing portion 201 is electrically connected to the external connector 300, and the electric connection can be inserted or welded, etc. In this embodiment, welding is used. The external connector 300 is used to connect the external power supply, and the external connector 300 can be in the form of a socket, a plug or the like, and it can be provided with or without a wire. In the present embodiment, the external connector 300 is a plug with wire.

The installation seat 100 is provided with an installation cavity 101 that accommodates the fixing portion 201 and the external connector 300 and a locking mechanism 102 for detachable fix of the installation seat 100. The installation cavity 101 is provided with an hole 103 providing for the elastic portion 202 extending out, and the elastic portion 202 is provided with a retractable electrical contact 2021.

In order to facilitate manufacturing, the installation cavity 101 is generally formed by a casing and a lid, and the lid can be an upper cover, a lower cover, a front cover or a rear cover. In this embodiment, the upper casing 1011 and the lower cover 1012 are used to buckle and close to form the installation cavity 101, and a screw 1013 is provided for further fastening.

the locking mechanism 102 includes a locking tongue 1021 formed by the installation cavity 101 extending outwards, in the present embodiment, the locking tongue 1021 is arranged on the outer wall of the upper casing 1011, both sides of the locking tongue 1021 are clamping edge 1022, and the clamping edge 1022 is coordinated with the power supply track that needs power supply. The middle portion of the locking tongue 1021 is provided with a first lock hole 1023, and a detachable locking member 1024 is arranged in the first lock hole 1023. The locking member 1024 can be threaded fasteners such as bolts or screws, and can also be fasteners such as buckles and locking pins. In this embodiment, the locking member 1024 adopts screws, and the reaction force of the locking member 1024 in the locking process is applied to the clamping edge 1022 to achieve the fixing of the installation seat 100.

There are many forms of the elastic portion in the elastic electrical conductive member 200, such as shrapnel and spring needle, wherein the spring needle is generally required to fit with the spring. In order to simplify the structure, the elastic electrical conductive member 200 is a strip-shaped shrapnel, and the strip-shaped shrapnel includes a back section as a fixing portion 201 and a front section as an elastic portion 202, and one end of the front section of the strip-shaped shrapnel is connected with the fixing portion 201, and the other end extends out the hole 103 and bends outward to form an electrical contact 2021. In this embodiment, the electrical contact 2021 is curved.

the installation cavity 101 is provided with a plug block 104 extending outwards to install the elastic portion 202. The plug block includes a block body 1045 and a lower baffle 1046, and the block body 1045 is formed by the upper casing 1011 extending outwards, and the lower baffle 1046 is formed by the lower cover 1012 extending outwards. The plug block 104 is provided with a fixed groove 1041 that fixes the end of the front section of the shrapnel. The plug block 104 can guide and install the elastic portion 202, and the fixation of the end can make the elastic portion 202 are not easily deformed.

In order to prevent the permanent deformation and collapse of the shrapnel and solve the problem of poor contact and contact failure, the plug block 104 is provided with a stop block 1043 located inside the electric contact 2021. Stop block 1043 can support the electrical contact 2021 after the elastic portion 202 loses its elasticity to prevent failure.

The front section of the shrapnel is inwardly bent in the portion between the electrical contact 2021 and the back section of the elastic sheet. The elasticity of the elastic portion 202 can be improved, and the lateral space can be saved, and the insertion direction of the plug is defined as a longitudinal direction, and the vertical direction is perpendicular to the vertical direction. A guide groove 1044 guides the elastic portion 202 is also provided on the plug block 104.

For the corresponding positive, negative electrode wire, further, the elastic electrical conductive member 200 is provided with two. The positional relationship of the two elastic electrical conductive members 200 is arranged according to the setting of the strip-shaped electrical conductive members in the power supply track, which can be set parallel to each other, or opposite or relative.

For a compact U-shaped power supply track, the electrical contact 2021 of the two elastic portions 202 are arranged backward when the strip-shaped electrical conductive members are set to both sides. In this embodiment, the stop block 1043 is arranged as a cross fence between the inside of the two electrical contact 2021. Further, the two elastic electrical conductive members 200 of this embodiment are symmetrically arranged on the plug block 104.

the locking tongue 1021 is located above the plug block 104, and the plug block 104 is provided with a second lock hole 1042, which is coaxial arranged with the first lock hole 1023 and matched with the locking member 1024. The locking member 1024 simultaneously passes through the first lock hole 1023 and the second lock hole 1042, In this embodiment, the first lock hole 1023 is a through-hole, and the second lock hole 1042 is threaded with the locking member 1024 to improve the locking effect.

Figure 5:
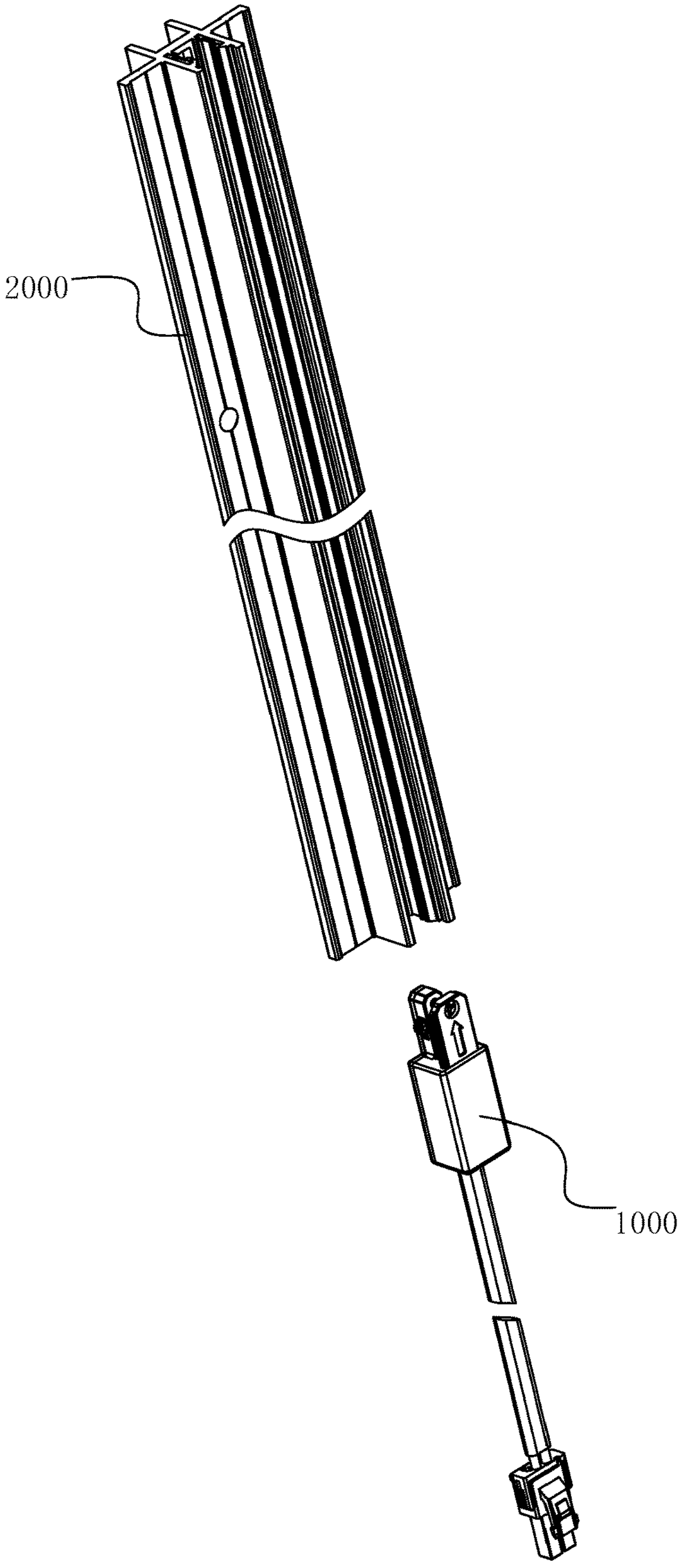
FIG. 5 is a three-dimensional structure diagram of the power supply track system (not connected in) in this embodiment.
Figure 6:
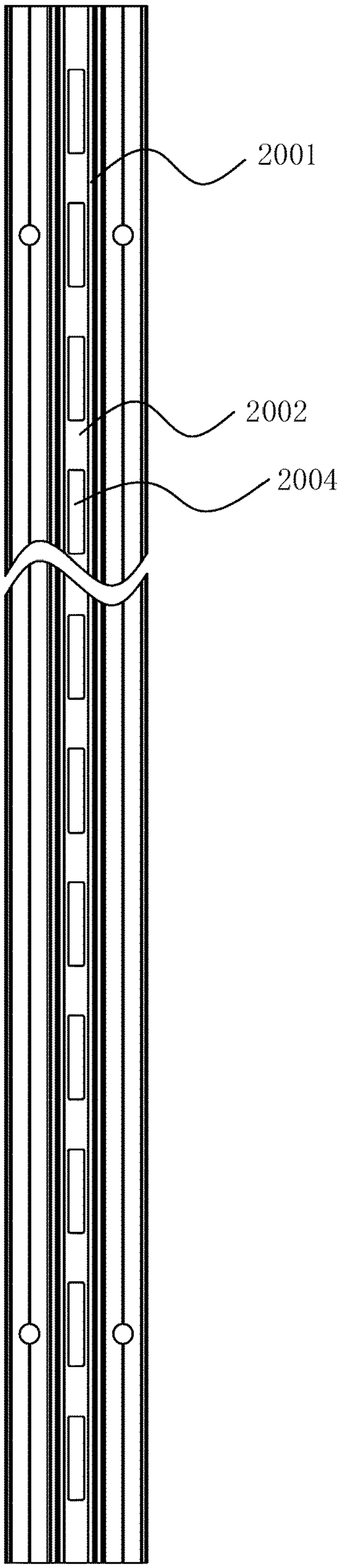
FIG. 6 is a structural diagram of a power supply track in this embodiment.
Figure 7:
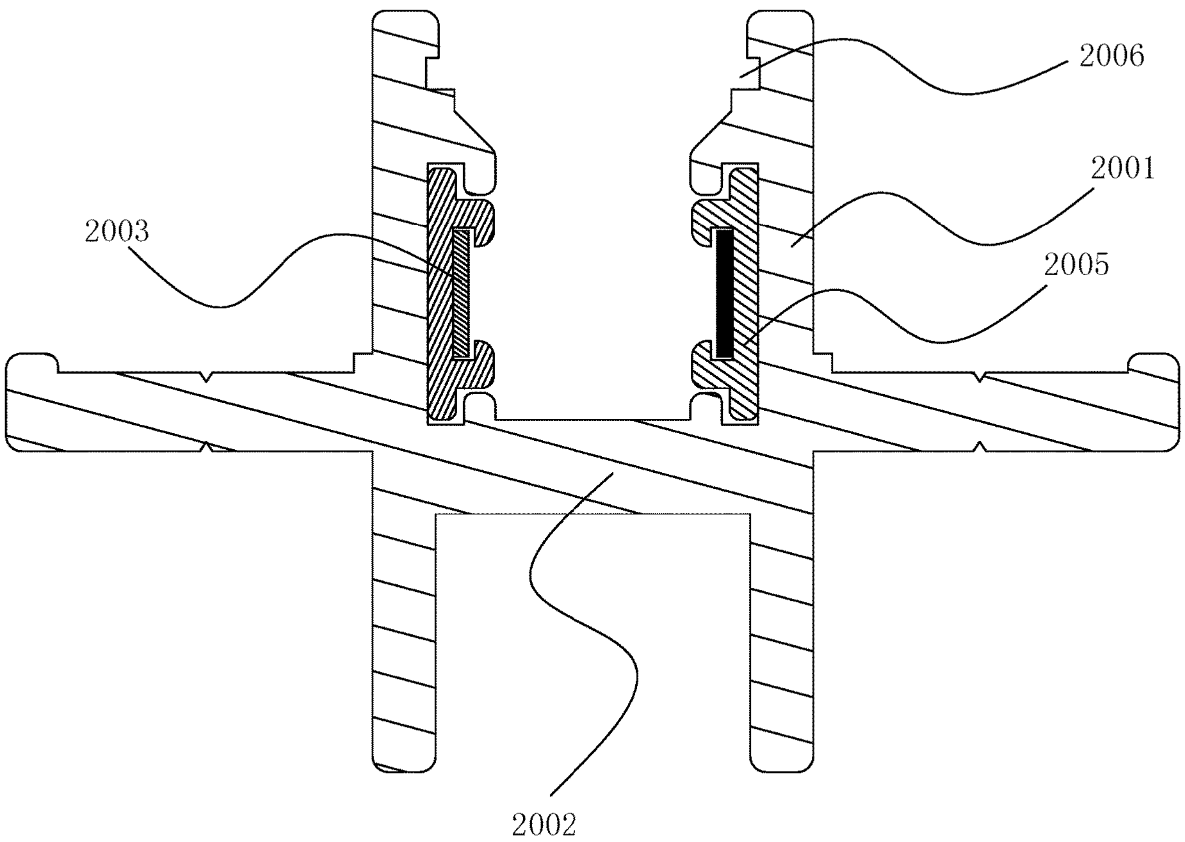
FIG. 7 is a structural schematic diagram of the cross-section of the power supply track in this embodiment.
Figure 8:
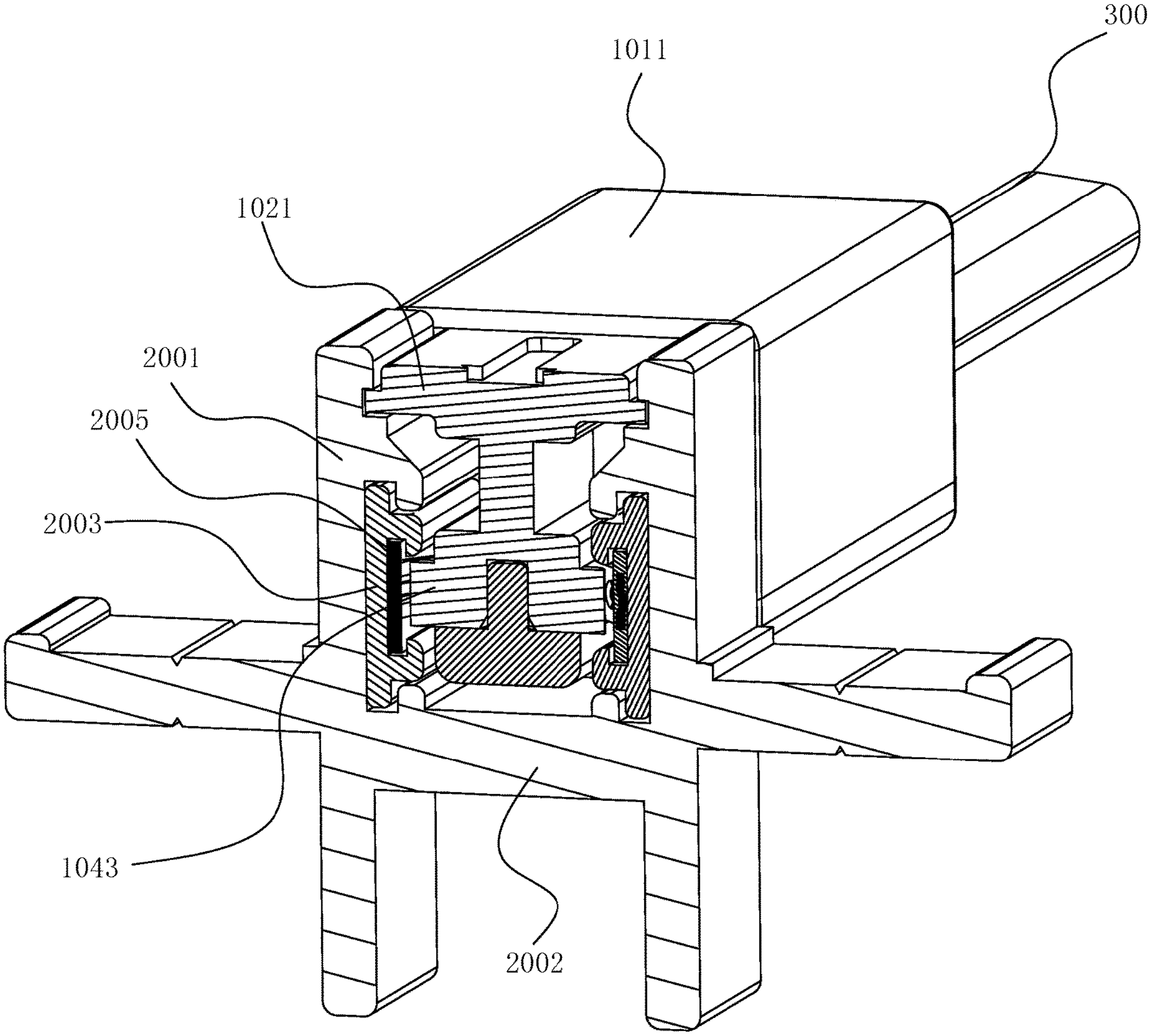
FIG. 8 is a sectional diagram of the cross section of the power supply track system at the electrical contact end in this embodiment.
Figure 9:
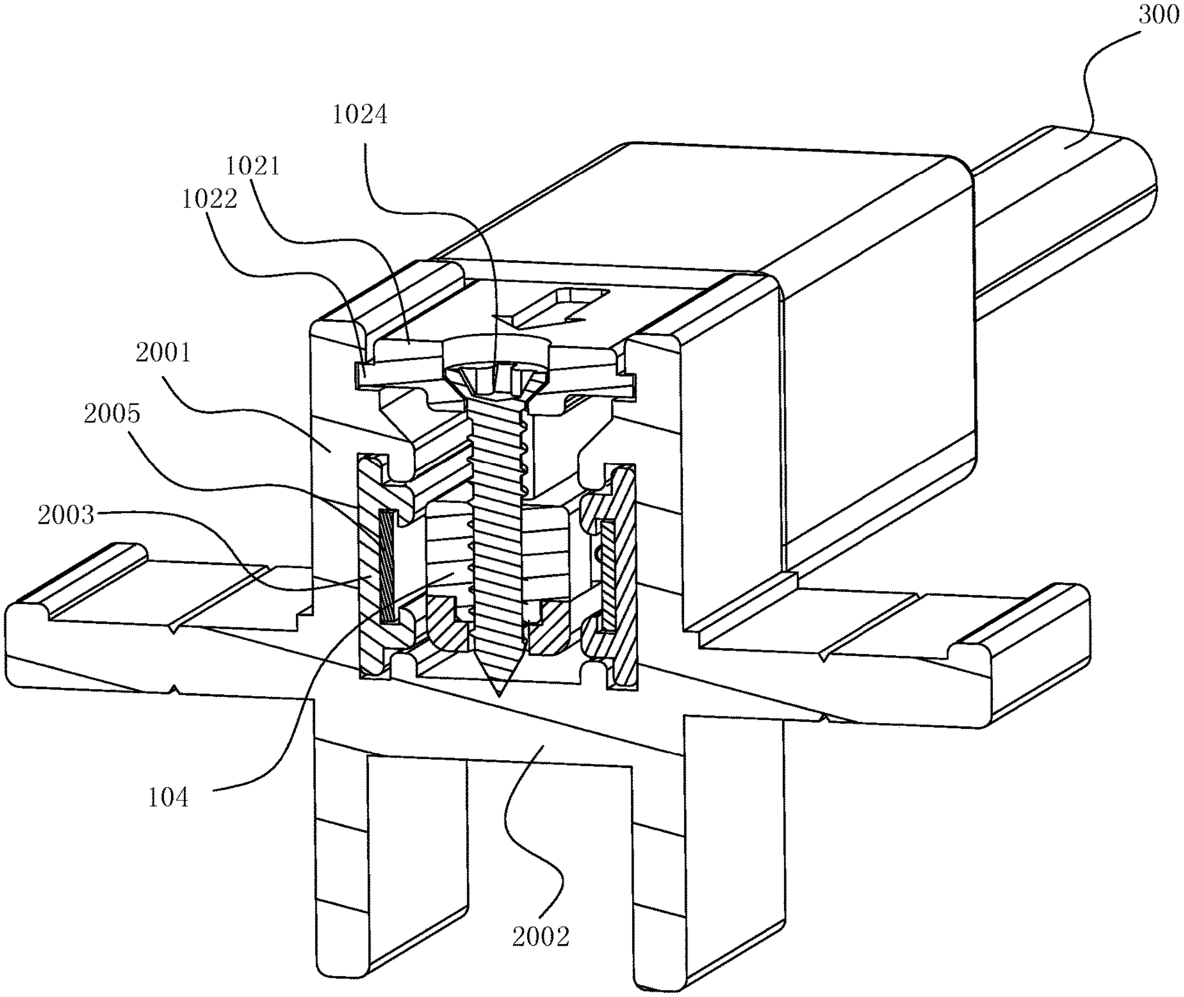
FIG. 9 is a sectional diagram of the cross-section of the power supply track system at the locking member in this embodiment.

The power-inlet plug 1000 in this embodiment can be used in a variety of power supply tracks to form a power supply track system, as shown in FIG. 5-9. The power supply track system in this embodiment includes a power supply track 2000 and an power-inlet plug 1000 disposed at the end of the power supply track 2000. The power supply track 2000 includes two strip-shaped baffle 2001, a bottom plate 2002, and two strip-shaped electrical conductive member 2003. The bottom plate 2002 is located on the same side of two strip-shaped baffle 2001 and is connected with two strip-shaped baffle 2001. The two strip-shaped electrical conductive members 2003 are respectively arranged on the inside of two strip-shaped baffle 2001. Corresponding, the power-inlet plug 1000 includes a installation seat 100, two elastic electrical conductive members 200 and an external connector 300. The elastic electrical conductive member 200 includes a fixing portion 201 and an elastic portion 202 electrically connected with the fixing portion 201. The installation seat 100 is provided with an installation cavity 101 accommodating the fixing portion 201 and the external connector 300 and a detachable locking mechanism 102 that disassembles the installation seat 100. The installation cavity 101 is provided with an hole 103 for the elastic portion 202 extending out. The elastic portion 202 is provided with a telescopic electrical contact 2021, and the electrical contact 2021 of the two elastic portions 202 is arranged backward to connect with two strip-shaped electrical conductive member 2003 respectively.

The power supply track 2000 of this embodiment can be used to fix the laminate at the same time, and the bottom plate 2002 is provided with a plurality of connecting holes 2004 distributed along the length direction. The connecting hole 2004 can be fixed to the hook portion on the laminate. The strip-shaped baffle 2001 is made of metal material, and the power supply track 1000 also includes a strip-shaped insulating lining board 2005 arranged on the inner side of the strip-shaped baffle 2001, and the strip-shaped electrical conductive member 2003 is arranged on the strip-shaped insulating lining board 2005.

The inner side of the strip-shaped baffle 2001 is provided with a card slot 2006, and the locking mechanism 102 includes the installation cavity 101 extending outward to form a locking tongue 1021, and both sides of the locking tongue 1021 are clamping edges 1022 matched with the card slot 2006. The middle part of the locking tongue 1021 is provided with a first lock hole 1023, the first lock hole 1023 is provided with a removable locking member 1024, The reaction force formed by the locking member 1024 in the process of locking is used to make the clamping edge 1022 and the card slot 2006 close to generate friction to achieve the installation seat 100 fixed. The locking member 1024 passes through the first lock hole 1023 and is tightened or fixed to the bottom plate 2002, generating a reaction force to the clamping edge 1022, so that the clamping edge 1022 and the card slot 2006 are pressed to produce friction to achieve the installation seat 100 fixed.

the elastic electrical conductive member 200 is a strip-shaped shrapnel, the strip-shaped shrapnel comprises a rear section of the shrapnel as a fixing portion 201 and a front section of the shrapnel as an elastic portion 202, one end of the front section of the shrapnel is connected with the fixing portion 201, the other end extends out the hole 103 and bends outward to form an electric contact 2021. The installation cavity 101 is provided with a block 104 extending outwards for setting the elastic portion 202, and the block 104 is provided with a fixed groove 1041 fixing the end of the front segment of the shrapnel. The block 104 can guide and install the elastic portion 202, and the fixation of the end can make the elastic portion 202 are not easily deformed.

the card slot 2006 is located above the strip-shaped electrical conductive member 2003, and the locking tongue 1021 is located above the block 104, and the block 104 is provided with a second lock hole 1042, which is coaxial arranged with the first lock hole 1023 and matched with the locking member 1024. The locking member 1024 simultaneously passes through the first lock hole 1023 and the second lock hole 1042, even if the locking member 1024 is not in contact with the bottom plate 2002 (in the case of connecting hole 2004), the clamping edge 1022 and the card slot 2006 can be tightened to achieve the fixing of the installation seat 100. In this example, The first lock hole 1023 is a through-hole, and the second lock hole 1042 is threaded with the locking member 1024.

The above are only preferred embodiments of the present invention, and are not used to limit the protection scope of the present invention. Any modification, equivalent replacement or improvement within the spirit of the present invention is covered by the scope of the claims of the present invention.

What is claimed is:

1. An power-inlet plug of a power supply track comprising:

an installation seat (100), an elastic electrical conductive member (200) and an external connector (300), wherein, the elastic electrical conductive member (200) is a strip-shaped shrapnel comprising a back section as a fixing portion (201) and a front section as an elastic portion (202) having a first end electrically connected to the fixing portion (201), the installation seat (100) is provided with an installation cavity (101) that accommodates the fixing portion (201) and the external connector (300) and a locking mechanism (102) for detachable fix of the installation seat (100), the installation cavity (101) is provided with a hole (103) out of which the elastic portion (202) extends, and the elastic portion (202) having a second end which extends out of the hole (103) and bends outward to form an electrical contact (2021); and the installation cavity (101) has a plug block (104) extending outwards to install the elastic portion (202), and the plug block (104) comprises a block body (1045) and a lower baffle (1046), the plug block (104) is provided with a fixed groove (1041) that fixes the second end of the shrapnel.

2. The power-inlet plug of a power supply track as claimed in claim 1, wherein the locking mechanism (102) comprises a locking tongue (1021) formed by the installation cavity (101) extending outwards, both sides of the locking tongue (1021) are clamping edges (1022), a middle portion of the locking tongue (1021) is provided with a first lock hole (1023), and a detachable locking member (1024) is arranged in the first lock hole (1023), and during the locking process a reactionary force of the locking member (1024) is applied to the clamping edge (1022) to fix the installation seat (100).

3. The power-inlet plug of a power supply track as claimed in claim 1, wherein a locking tongue (1021) is located above the plug block (104), and the plug block (104) is provided with a second lock hole (1042), which is coaxially arranged with the first lock hole (1023) and matched with the locking member (1024).

4. The power-inlet plug of a power supply track as claimed in claim 1, wherein the plug block (104) is provided with a stop block (1043) located at an inner side of the electric contact (2021).

5. The power-inlet plug of a power supply track as claimed in claim 4, wherein locking tongue (1021) is located above the plug block (104), and the plug block (104) is provided with a second lock hole (1042), which is coaxially arranged with the first lock hole (1023) and matched with the locking member (1024).

6. The power-inlet plug of a power supply track as claimed in claim 1, wherein the front section of the shrapnel is inwardly bent on the portion between the electrical contact (2021) and the fixing portion (201).

7. The power-inlet plug of a power supply track as claimed in claim 6, wherein a locking tongue (1021) is located above the plug block (104), and the plug block (104) is provided with a second lock hole (1042), which is coaxially arranged with the first lock hole (1023) and matched with the locking member (1024).

8. The power-inlet plug of a power supply track as claimed in claim 1, further comprising a second elastic electrical conductive member (200).

9. The power-inlet plug of a power supply track as claimed in claim 8, wherein the electrical contacts (2021) of the two elastic portions (202) mirror each other.

10. A power supply track system comprising a power supply track (2400 (2000) and an power-inlet plug (1000) as claimed in claim 1 disposed at an end of the power supply track (2000), wherein, the power supply track (2000) comprises two strip-shaped baffles (2001), a bottom plate (2002), and two strip-shaped electrical conductive members (2003), and the bottom plate (2002) is located on the same side of the two strip-shaped baffles (2001) and is connected with the two strip-shaped baffles (2001), and the two strip-shaped electrical conductive members (2003) are respectively arranged on an inner side of the two strip-shaped baffles (2001); and the electrical contact (2021) of the two elastic portions (202) are arranged to connect with the two strip-shaped electrical conductive members (2003) respectively.

11. The power supply track system as claimed in claim 10, wherein the bottom plate (2002) is provided with a plurality of connecting holes (2004) distributed along a lengthwise direction.

12. The power supply track system as claimed in claim 10, wherein the strip-shaped baffle (2001) is made of metal material, and the power supply track (1000) also comprises a strip-shaped insulating lining board (2005) arranged on the inner side of the strip-shaped baffle (2001), and the strip-shaped electrical conductive member (2003) is arranged on the strip-shaped insulating lining board (2005).

13. The power supply track system as claimed in claim 10, wherein the inner side of the strip-shaped baffle (2001) is provided with a card slot (2006), and the locking mechanism (102) comprises the installation cavity (101) extending outward to form a locking tongue (1021), and both sides of the locking tongue (1021) are clamping edges (1022) matched with the card slot (2006), and a middle part of the locking tongue (1021) is provided with a first lock hole (1023), the first lock hole (1023) is provided with a removable locking member (1024), and a reactionary force formed by the locking member (1024) in the process of locking is used to adhere the clamping edge (1022) to the card slot (2006) to generate friction in order to fix the installation seat (100) in place.

14. The power supply track system as claimed in claim 13, wherein the card slot (2006) is located above the strip-shaped electrical conductive member (2003), and the locking tongue (1021) is located above the block (104), and the block (104) is provided with a second lock hole (1042), which is coaxially arranged with the first lock hole (1023) and matched with the locking member (1024).

* * * * *